US010235266B2

(12) United States Patent
Venkataraman

(10) Patent No.: US 10,235,266 B2
(45) Date of Patent: Mar. 19, 2019

(54) APPLICATION SCREEN MAPPING FOR MOBILE ANALYTICS

(71) Applicant: CA, Inc., New York, NY (US)

(72) Inventor: Seshadri Venkataraman, Union City, CA (US)

(73) Assignee: CA, Inc., New York, NY (US)

( * ) Notice: Subject to any disclaimer, the term of this patent is extended or adjusted under 35 U.S.C. 154(b) by 741 days.

(21) Appl. No.: 14/795,996

(22) Filed: Jul. 10, 2015

(65) Prior Publication Data
US 2017/0010951 A1 Jan. 12, 2017

(51) Int. Cl.
*G06F 11/36* (2006.01)

(52) U.S. Cl.
CPC .......... *G06F 11/3612* (2013.01); *G06F 11/36* (2013.01); *G06F 11/3604* (2013.01)

(58) Field of Classification Search
CPC .................. G06F 11/3604; G06F 11/3612
See application file for complete search history.

(56) References Cited

U.S. PATENT DOCUMENTS

| 8,504,994 | B2* | 8/2013 | Golender | G06F 9/4446 |
| | | | | 717/128 |
| 9,152,541 | B1* | 10/2015 | Kuo | G06F 11/3672 |
| 9,195,829 | B1* | 11/2015 | Goradia | G06F 11/3608 |
| 9,372,779 | B2* | 6/2016 | Ligman | G06F 11/3612 |
| 9,836,193 | B2* | 12/2017 | Ligman | G06F 3/04842 |
| 10,019,338 | B1* | 7/2018 | Goradia | G06F 11/3608 |
| 2003/0126613 | A1* | 7/2003 | McGuire | G06F 11/321 |
| | | | | 725/109 |

(Continued)

OTHER PUBLICATIONS

Yang et al., "A Grey-Box Approach for Automated GUI-Model Generation of Mobile Applications," 2013, International Conference on Fundamental Approaches to Software Engineering, pp. 250-265, downloaded from the Internet at <url>:https://link.springer.com/chapter/10.1007/978-3-642-37057-1_19. (Year: 2013).*

(Continued)

*Primary Examiner* — Thuy Dao
*Assistant Examiner* — Stephen D Berman
(74) *Attorney, Agent, or Firm* — Sage Patent Group

(57) ABSTRACT

Disclosed herein are methods that include receiving application source code of a mobile application, analyzing the application source code to generate screen metadata that represents screen images that will be generated by the mobile application upon execution of binary application code generated from the application source code, storing the screen metadata in a screen metadata file, and associating the screen metadata file with the mobile application. Other methods disclosed herein include analyzing operation of a mobile application during runtime execution of the mobile application, identifying a reportable runtime event during operation of the mobile application, and in response to identifying the reportable runtime event, generating screen data that describes a screen image generated by the mobile application and associated with the reportable runtime event, generating a runtime event report, wherein the runtime event report includes the screen data, and transmitting the runtime event report to an application analysis computer.

16 Claims, 15 Drawing Sheets

(56) References Cited

U.S. PATENT DOCUMENTS

| | | | | |
|---|---|---|---|---|
| 2008/0148235 | A1* | 6/2008 | Foresti | G06F 11/3604 |
| | | | | 717/123 |
| 2010/0088683 | A1* | 4/2010 | Golender | G06F 9/4446 |
| | | | | 717/128 |
| 2013/0124924 | A1* | 5/2013 | Kawaguchi | G06F 11/3612 |
| | | | | 714/38.1 |
| 2014/0298093 | A1* | 10/2014 | Cook | G06F 11/36 |
| | | | | 714/27 |
| 2014/0380282 | A1* | 12/2014 | Ravindranath Sivalingam | |
| | | | | G06F 11/3476 |
| | | | | 717/128 |
| 2015/0039745 | A1* | 2/2015 | Degioanni | H04L 43/045 |
| | | | | 709/224 |
| 2015/0052503 | A1* | 2/2015 | Ligman | G06F 11/3664 |
| | | | | 717/125 |
| 2015/0378756 | A1* | 12/2015 | Lensmar | G06F 8/53 |
| | | | | 717/148 |
| 2016/0291952 | A1* | 10/2016 | Velasco | G06F 8/61 |
| 2016/0364223 | A1* | 12/2016 | Vandikas | H04W 4/50 |

OTHER PUBLICATIONS

Amalfitano et al., "Using GUI ripping for automated testing of Android applications," 2012, Proceedings of the 27th IEEE/ACM International Conference on Automated Software Engineering, pp. 258-261, downloaded from the Internet at <url>:https://dl.acm.org/citation.cfm?id=2351717. (Year: 2012).*

Anand et al., "Automated concolic testing of smartphone apps," 2012, Proceedings of the ACM SIGSOFT 20th International Symposium on the Foundations of Software Engineering, Article No. 19, pp. 1-11, downloaded from the Internet at <url>:https://dl.acm.org/citation.cfm?id=2393666. (Year: 2012).*

\* cited by examiner

APPLICATION SCREEN MAPPING FOR MOBILE ANALYTICS

FIELD

The inventive concepts described herein relate to software applications for mobile computing devices. In particular, the inventive concepts relate to mobile application analytic software that monitors, tests and/or manages software applications for mobile devices.

BACKGROUND

Mobile Application Analytics (MAA) is a class of software applications that enable application developers and others to monitor the performance of mobile applications, i.e., applications developed for mobile devices, during runtime. MAA applications can provide visibility into the operation of mobile applications and produce data that can help enhance and increase usage of the application, to respond to crash reports, and/or to identify new features for the application. MAA can enable developers to visualize and analyze the user's experience and to capture and investigate issues by providing real-world customer usage data to application development teams.

Accordingly, MAA enables application developers to understand the mobile application user experience across an application development life cycle, which can stimulate collaboration between business analysts, developers, operations and support in order to accelerate mobile application delivery, improve mobile application support and increase the value delivered via the mobile end-user experience.

Using MAA, business analysts can work together with developers to strengthen user loyalty by instrumenting mobile applications to collect critical business, performance and health data across languages, methodologies and platforms. IT operations teams can investigate where issues reside across the end-to-end mobile application infrastructure. IT operations teams and support teams can then feed that real-user data back to the application development teams to improve the next version of the application, which can enhance the user experience. MAA can also provide a better understanding of the usage of the application by geography, carrier, and device.

Mobile applications are typically distributed in an application package containing the elements needed to run the application, such as the program code, resources, certificates and a manifest.

An instrumenting application, such as an MAA application, can be attached to the mobile application by modifying the program code of the application to include the MAA code. This modification is referred to as "application wrapping." When an application is wrapped, a layer of code is added to the application binary file to add features or modify behavior of the application without making changes to the internal application code. In addition to MAA functions, wrapping code may also be used to reduce the risk to an enterprise of improper or unauthorized use of an application. For example, wrapping can add security and management features to an application before it is deployed to the enterprise.

An MAA application may generate screenshots of the mobile application in order to document user activity for crash analysis, usage analysis, or other purposes. The screen shots may be provided by the MAA application to a developer, who can analyze the screen shots to determine what screens the user visited and what actions the user took on the screens. However, generating, storing and transmitting screen shots may consume an undesirably large amount of resources of a mobile computing device, including battery power, processing cycles and storage.

SUMMARY

Some embodiments of the inventive concepts provide methods that include receiving application source code of a mobile application, analyzing the application source code to generate screen metadata that represents screen images that will be generated by the mobile application upon execution of binary application code generated from the application source code, storing the screen metadata in a screen metadata file, and associating the screen metadata file with the mobile application.

Some further embodiments of the inventive concepts provide methods that include analyzing operation of a mobile application during runtime execution of the mobile application, identifying a reportable runtime event during operation of the mobile application, and in response to identifying the reportable runtime event, generating screen metadata that represents a screen image generated by the mobile application and associated with the reportable runtime event, generating a runtime event report, wherein the runtime event report includes the screen metadata, and transmitting the runtime event report to an application analysis computer.

Some further embodiments of the inventive concepts provide methods that include receiving a runtime event report detailing a runtime event of a mobile application, the runtime event report including screen metadata that describes a screen image associated with the runtime event, and generating a simulated screen image of the mobile application associated with the runtime event from the screen metadata.

Some further embodiments of the inventive concepts provide methods that include receiving binary executable code of a mobile application, executing the binary executable code to generate screen images, storing the screen images in a screen image repository, and associating the screen images with the mobile application.

Some further embodiments of the inventive concepts provide methods that include receiving a runtime event report detailing a runtime event of a mobile application, the runtime event report including a screen ID associated with a screen image generated by the mobile application when the runtime event occurred, and retrieving a stored screen image associated with the screen ID from a screen image repository.

Other methods, computer program products, and/or electronic devices according to embodiments of the present disclosure will be or become apparent to one with skill in the art upon review of the following drawings and detailed description. It is intended that all such methods, computer program products, and/or electronic devices be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION OF EMBODIMENTS

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
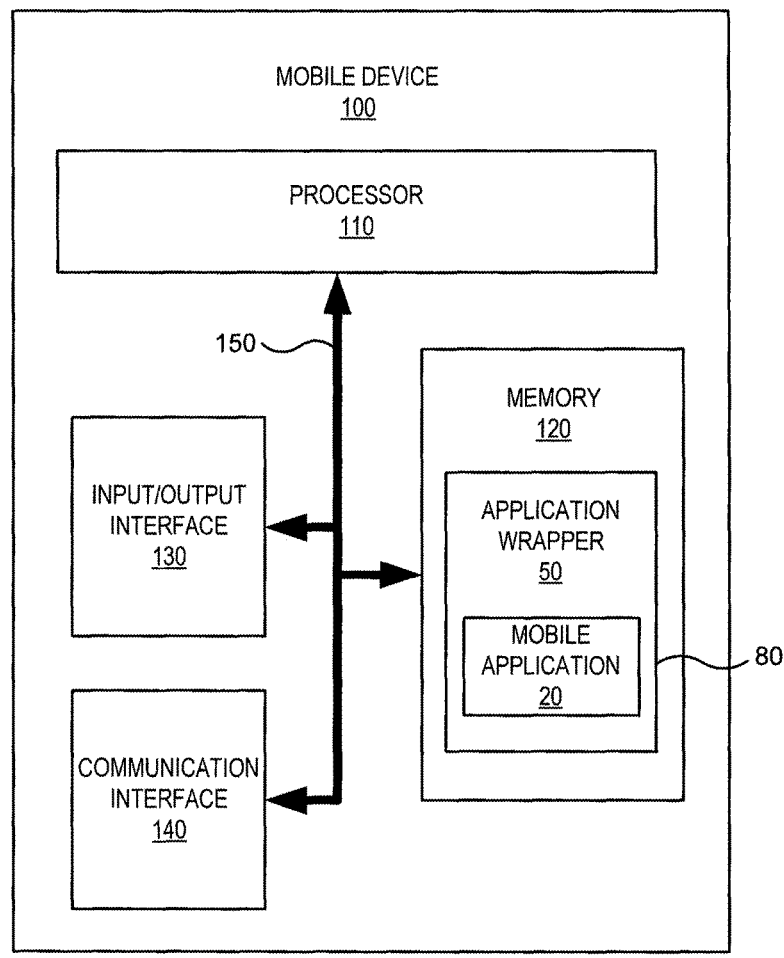
FIG. 1 is a block diagram illustrating a mobile computing device according to some embodiments.

FIG. 1 illustrates a computing device 100, such as a mobile computing device, on which an application program 20 is installed. The application program is encapsulated by a mobile application analytics (MAA) application wrapper 50. The computing device 100 includes a processor 110, such as a microprocessor, microcontroller, etc., that controls operation of the device 100. The processor 110 communicates with a memory 120, an input/output interface 130 and a communication interface 140 via a system bus 150. A mobile application 20 is installed in the memory 120 of the computing device 100. The mobile application 20 is encapsulated by an MAA application installed as an application wrapper 50 that encloses the application code 20 of the mobile application to provide a wrapped mobile application 80.

Figure 2A:
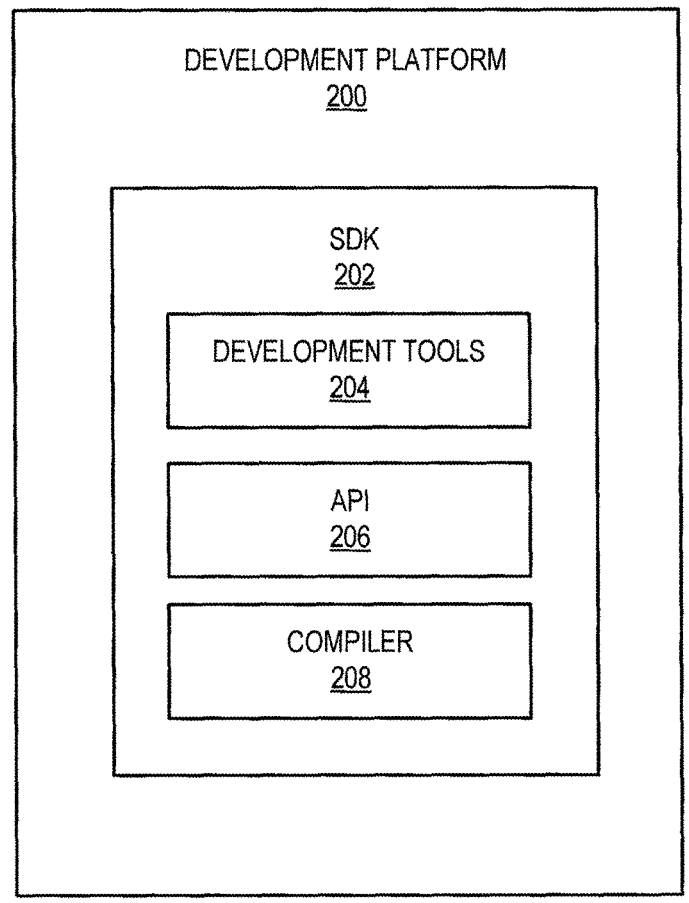
FIG. 2A is a block diagram illustrating a software development platform according to some embodiments.

FIG. 2A illustrates a development platform 200 for generating an application installation package 230 including an MAA application wrapper. The application installation package 230 is used to install the mobile application 20 including the MAA application 50 wrapper on a mobile device 100.

Referring to FIG. 2A, the development platform 200 may include a software development kit (SDK) 202 that enables an application developer to wrap a mobile application with an application wrapper that performs one or more of the functionalities described herein. As described herein, an application wrapper can be applied to a mobile application by modifying the application's source code, linking to predefined "hooks" in the application's object code, or any other software connection to an application's code. The development platform 200 can be implemented on any suitable computer hardware. A software developer can create an application by generating program code and compiling it into an executable program compatible with a mobile device 100.

The SDK 202 can include a library of development tools 204 that provide various different functionalities. The development tools 204 can include a source code editor with an integrated debugger, along with code snippets, data structures, protocols, routines, and the like. The SDK 202 can include an application programming interface (API) 206 that enables an application to interface with the development tools 204. The SDK 202 can include a compiler 208 for converting source code into machine-readable object code. It will be appreciated that the SDK 202 can include other features in addition to these, and need not include all of the illustrated features.

Figure 3:
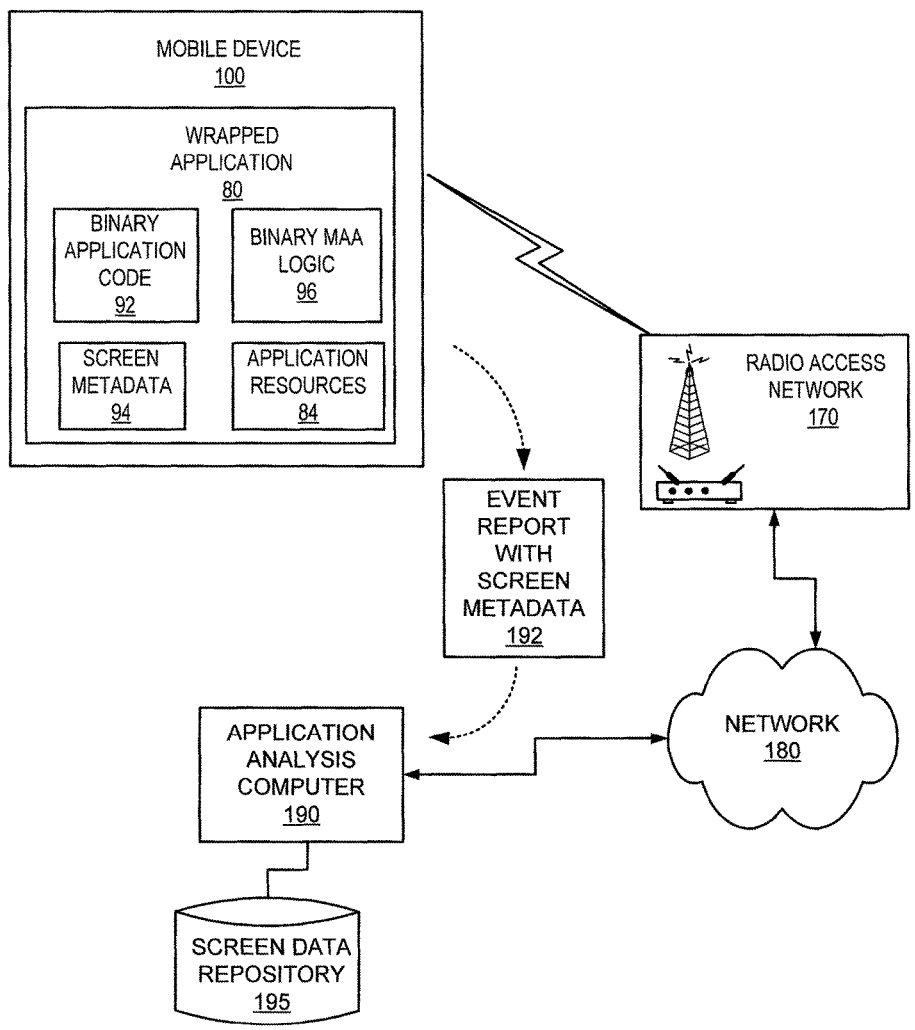
FIG. 3 is a block diagram illustrating the transmission of an event report from a mobile computing device to an application analysis computer according to some embodiments.

The development tools 204 can include tools for wrapping a mobile device software application. For example, in some embodiments, the SDK 202 includes a development tool 204 that allows an application developer to wrap an application with an MAA application that monitors the operation of the mobile application. The MAA application can perform functions such as application fault detection, application performance measurement, and the detection of reportable events, such as device crashes, hangs and freezes, during the operation of the mobile application. The MAA functionality can include the logging of detected faults, performance measurements, related events, event times, event locations, and other data within a local storage of a mobile device. The MAA application may report such data to a network resource, such as an application analysis computer 190 (FIG. 3). This functionality can give developers and IT administrators visibility into how the application is performing on the mobile device. Further, the application analysis computer 190 can analyze data across multiple different mobile devices that run the mobile application. The embedded functionality can include encrypting the data logged on the mobile device and/or reported to other components via network communications.

Figure 2B:
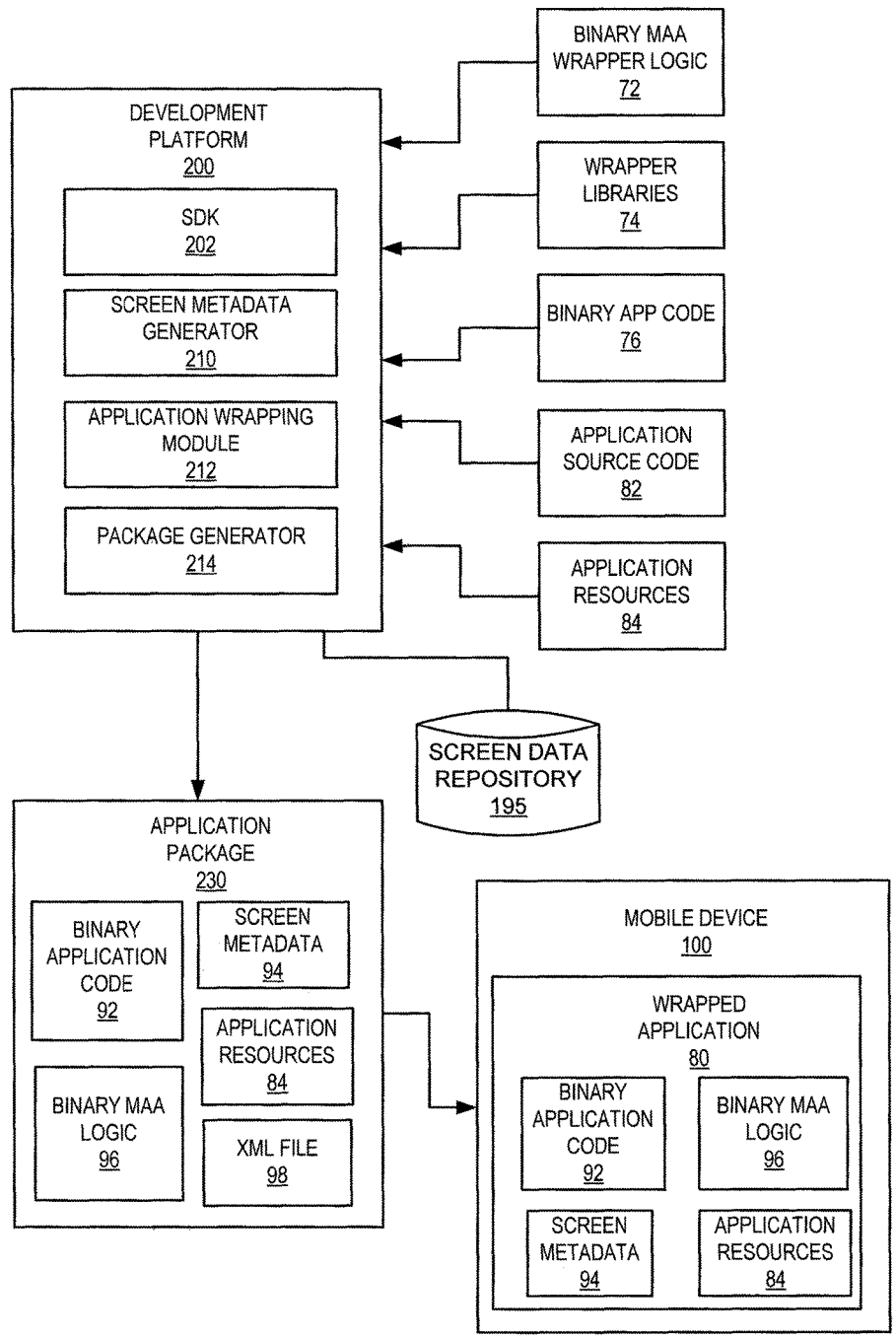
FIG. 2B is a block diagram illustrating the packaging and installation of an application on a mobile computing device.

FIG. 2B illustrates the generation and installation of an application package on a mobile device 100 using a development platform 200 according to some embodiments.

The development platform 200 may receive as inputs binary MAA application wrapper logic 72, application wrapper libraries 74, binary mobile application code 76, mobile application source code 82 and application resources 84. It will be appreciated that the binary MAA application wrapper logic 72 and the application wrapper libraries 74 may be developed and compiled on the development platform 200, or may be developed and compiled externally to the development platform 200. The binary MAA application wrapper logic 72 is the binary code of the MAA application 50. The application wrapper libraries 74 are software libraries that support the function of the MAA application code. The binary application code 76 is the executable code of the mobile application, while the application source code 82 is the source code of the mobile application.

In some embodiments, the development platform 200 may compile and link the application source code 82 to generate the binary application code 76.

In addition to the SDK 202, the development platform 200 may include a number of other functional modules, including a screen metadata generator 210, an application wrapping module 212, and a package generator 214. It will be appreciated that the screen metadata generator 210, the application wrapping module 212, and the package generator 214 may be provided as part of or separately from the SDK 202.

The application wrapping module generates 212 a wrapped mobile application by linking the binary application code 76 of the mobile application with the binary MAA application wrapper logic 72 along with the wrapper libraries 72 and any other included libraries to form binary application code 92 and binary MAA wrapper logic 96.

The package generator 214 generates an application installation package 230 for installing the mobile application on a mobile device. The application installation package 230 may include the binary application code 92 of the mobile application, the binary MAA wrapper logic 96 of the MAA application, and a screen metadata file 94, described in more detail below, along with application resources 84 and a manifest file 98 that contains a manifest of the application installation package. The manifest file 98 may be an XML file.

During the installation process, the application package 230 is provided to a mobile device 100, which extracts and installs the various components of the application package 230 according to instructions contained in the manifest 98. After installation, the mobile device 100 includes a wrapped application 80 that includes both the binary application code 92 of the mobile application along with the binary wrapper logic 96 of the MAA application. The wrapped application 80 also include the application resources 84 and the screen metadata file 94.

In some embodiments, the screen metadata generator 210 analyzes the application source code 82 of the mobile application and responsively generates data representing or describing screen images that will be displayed on the mobile device 100 by the mobile application 80 upon its execution. The screen metadata may, for example, include metadata that characterizes or describes the screen images generated by the mobile application at runtime. For example, screen metadata may describe various elements, such as images, controls, links, widgets, text boxes, labels, etc., that are displayed on the screen. The screen metadata may describe various attributes of the elements, such as the location, color, brightness, opacity, etc., of the elements. Thus, the screen metadata may include data that can be used to recreate the basic appearance of the screen, without requiring access to an actual image of the screen. The screen metadata may enable the basic appearance of the screen to be saved, transmitted and reproduced with significantly less data/bandwidth than would be required to save/transmit a screen shot or screen image.

The screen metadata generator 210 may store the screen metadata in a screen metadata file 94 and/or in a screen data repository 195. The screen metadata generator 210 may associate the screen metadata file 94 with the mobile application. In particular, the screen metadata generator 210 may associate the screen metadata file 94 with information identifying a particular version of the mobile application and/or a particular operating platform for which the application package 230 was generated.

In some embodiments, the screen metadata file 94 may be created by generating a storyboard file that provides a schematic representation of the screen images that will be generated by the mobile application upon execution of compiled code generated from the application source code. The storyboard file may be generated by parsing a NIB or XIB file and building a site map of the screen images generated by the mobile application. A NIB or XIB file may be one single file that shows all of the screens generated by the application, and showing transitions or flows between screens.

The site map may further include controls associated with the screen images generated by the mobile application. For example, the site map may include widgets, controls, switches, buttons, text boxes, check boxes, etc., that are displayed on the screen generated by the mobile application. The SDK 202 may include built-in support for parsing NIB and XIB files to obtain the various controls, widgets, etc., as well as for capturing the screen-by screen flow of the application. This information can be stored by the development platform 200 as screen metadata associated with particular screens of the application.

A model of the screen image generated by the mobile application can be recreated from data in the screen metadata file. As will be explained in more detail below, when a crash, hang, exception or other reportable event occurs during execution of the application program, the MAA application wrapper may retrieve screen metadata from the screen metadata file that is associated with the screen image that was being displayed by the mobile application when the reportable event occurred. Instead of transmitting a (relatively large) screen shot or series of screen shots to an application analysis computer in connection with the reportable event, the MAA application wrapper may transmit screen metadata describing the screen image, which may require the transmission of only a relatively small amount of data compared to the amount of image data that a screen shot comprises.

In other embodiments, the screen metadata generator 210 may generate screen metadata by loading the binary application code 76 into a virtual machine and running the binary application code. One or more screen shots of screens displayed by the mobile application can be captured showing screen layouts during various points of operation of the mobile application. The screen shots can be saved in the screen data repository 195. Each of the screen shots may be associated with a particular state of the application program 20, and may be identified by a screen ID, that may be stored in the screen metadata file 94. An application program may display a particular screen depending on the operational mode of the application program. For example, an application may display a loading screen, a landing or startup screen, a primary screen, an options screen, a login screen, a user preferences screen, etc., depending on the operational mode of the mobile application. Each screen may be saved as a screen shot in the screen data repository 195, and each screen may have an associated screen ID. For example, the loading screen, landing screen, primary screen, options screen, login screen, and user preferences screen may be associated with the screen IDs SCR000, SCR001, SCR002, SCR003, SCR004 and SCR005. These screen IDs are saved in the screen metadata file 94, along with data identifying the associated modes of the application program. The MAA application 50 can monitor the operational mode of the mobile application program 20, and when a reportable event occurs, the MAA application can send a screen ID to the application analysis computer 195 identifying the screen associated with the reportable event.

In these embodiments, when a reportable event occurs, the MAA application can send data representing the operational mode of the mobile application at the time of the reportable event to the application analysis computer 195, and the application analysis computer can retrieve a screen shot associated with the reportable event from the screen data repository 195 based on the data representing the operational mode of the mobile application provided by the MAA application.

Still referring to FIG. 2B, after the package generator 214 has generated the application installation package 230 including the binary application code 92 of the mobile application, the binary MAA wrapper logic 96 of the MAA application, the screen metadata file 94, the application resources 84 and the manifest 98, the application installation package 230 is distributed to the mobile device 100. Upon installation, the binary application code 92, the binary MAA wrapper logic 96, the screen metadata file 94, and the application resources 84 are stored in the mobile device 100 as a wrapped application 80.

Operation of the wrapped application 80 including the application code 92 and the MAA logic 96 is illustrated in FIG. 3. In FIG. 3, the mobile application 80 is installed and operating on the mobile device 100. From time to time, an event may occur during the operation of the mobile application that the binary MAA logic determines should be reported to an application analysis computer 190. Such an event, which may include, for example, an exception, crash, hang, buffer overflow, or other condition, is referred to herein as a "reportable event." A reportable event may be reported to the application analysis computer 190 so that a developer can determine the cause of the reportable event, collect statistics on the occurrence of reportable events, etc.

It will be appreciated that reportable events are not limited to crashes, hangs, and the like, but can include any event that occurs during the operation of the mobile application. For example, a business analyst may define a reportable event that enables the analyst to collect business, performance and health data related to the application.

When a reportable event occurs, the MAA logic 96 may send an event report 192 to the application analysis computer 190. In a typical embodiment illustrated in FIG. 3, the mobile device 100 may communicate over a radio access network 170 that is connected to a data communication network 180, such as the Internet. The application analysis computer 190 may also communicate with the data communication network 180. The MAA logic 96 may thus transmit the event report to the application analysis computer 190 over the radio access network 170 and the data communication network 180.

The event report 192 describes the reportable event and includes screen metadata associated with the reportable event. The screen metadata may include, for example, data describing a screen or series of screens that were displayed before, during and after the reportable event. The MAA logic 96 has access to the screen identifiers from the event stream and the registry of screen metadata that matches the screen identifiers to the reference screen images/captures.

The screen metadata may enable a developer to recreate or better understand the state of the mobile application at the time of the reportable event. For example, the screen metadata may be used to reconstruct a screen or series of screens along with user interaction data so that the developer can visually "play back" the operation of the application in the time period in which the reportable event occurred.

As described above, the screen metadata may include data, such as metadata, storyboard data or other data describing the screen images displayed by the mobile application. The screen metadata may in some embodiments include a screen ID that identifies a screen shot saved in the screen shot repository 195. In other embodiments, the screen metadata may include data regarding the state of the mobile application at the time of the reportable event and from which a corresponding screen shot can be identified. The screen metadata can include data from a storyboard file, and can include controls associated with the screen images generated by the mobile application, such as widgets, switches, text boxes, buttons, check boxes, etc., that are displayed on the screen generated by the mobile application.

Notably, however, the event report 192 may not include a screen image. As noted above, image data may require a large bandwidth to transmit, which may be particularly problematic when the event report 192 is transmitted over a wireless interface, such as via the radio access network 170. By including screen metadata in the event report 192 instead of an actual screen image, the size of the event report may be greatly reduced.

Figure 4A:
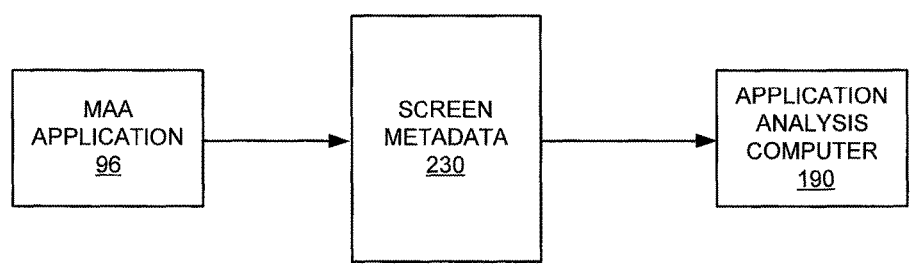
FIGS. 4A and 4B are flowcharts illustrating the transmission of screen metadata from a mobile computing device to an application analysis computer according to some embodiments.
Figure 4B:
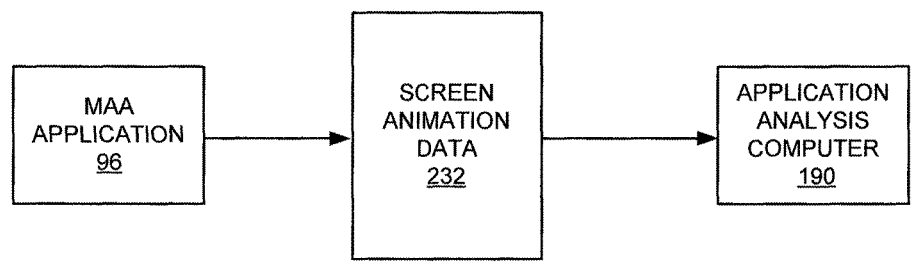

FIGS. 4A and 4B illustrate operations according to some embodiments. Referring to FIG. 4A, upon the occurrence of a reportable event, the MAA application 96 may send screen metadata 230 to an application analysis computer 190. The screen metadata 230 may require significantly less bandwidth than would be required if the MAA application 96 were to transmit actual screen images. More particularly, as shown in FIG. 4B, in some embodiments, upon the occurrence of a reportable event, the MAA application 96 may send screen animation metadata 232 to the application analysis computer 190. The screen animation metadata 232 may describing a series of screens that can be used to generate an animation showing the behavior and/or user interaction with the screen before, during and/or after the occurrence of the reportable event.

Figure 5A:
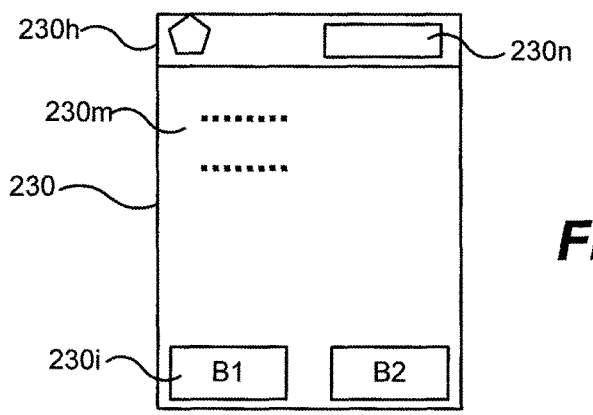
FIGS. 5A, 5B and 5C are schematic diagrams illustrating simulated screen images according to some embodiments.
Figure 5B:
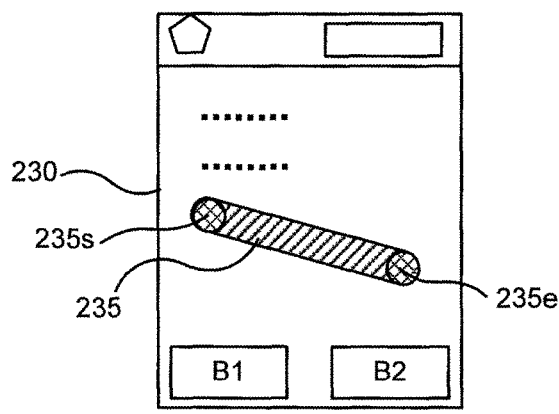

FIGS. 5A and 5B illustrate simulated screen images that may be generated from the screen metadata and/or screen animation metadata. For example, FIG. 5A illustrates a simulated screen 230 including a main area 230*m*, a header area 230*h* including a banner 230*n* and a footer area 230*i* including two buttons B1 and B2. FIG. 5B illustrates a simulated screen including gesture data that indicates a user interaction with the screen via a gesture 235 (e.g., a "swipe"). For example, the screen data that is used to generate the screen in FIG. 5B includes a starting point 235*s* and an ending point 23*e* of the swipe gesture. The screen metadata may define the starting time and ending time of the gesture in addition to the starting point and ending point of the gesture.

Figure 5C:
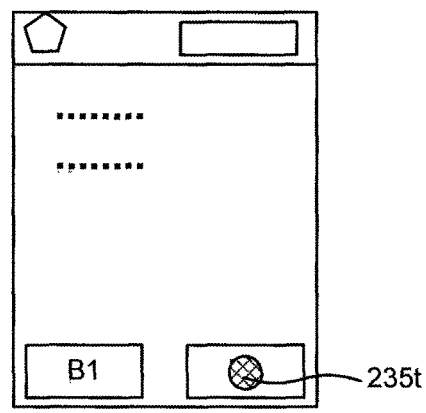

FIG. 5C illustrates the pressing of the button B2 via a screen tap 235*t*.

The metadata describing these screen elements may be formatted in the screen metadata 230 or screen animation metadata 232 as one or more XML files. For example, the screen metadata for the screen shown in FIG. 5A may include the following XML data to describe the screen layout:

```
<screen>
    <header>
        <element>
            <type>text</type>
            <xpos>200</xpos>
            <ypos>20</ypos>
```

-continued

```
            <height>20</height>
            <width>40</width>
            <bgcolor>#0F0</bgcolor>
        </element>
    </header>
    <body>
        <height>800</height>
        <width>400</width>
        <bgcolor>#FFF</bgcolor>
    </body>
    <footer>
        <element>
            <type>button</type>
            <text>B1</text>
            <xpos>20</xpos>
            <ypos>20</ypos>
            <height>20</height>
            <width>40</width>
            <bgcolor>#FF0</bgcolor>
        </element>
        <element>
            <type>button</type>
            <text>B2</text>
            <xpos>20</xpos>
            <ypos>20</ypos>
            <height>20</height>
            <width>40</width>
            <bgcolor>#FF0</bgcolor>
        </element>
    </footer>
</screen>
```

The metadata for the screenshot shown in FIG. 5B may additionally include the following XML data in the <screen> tag to describe the gesture 235:

```
<gesture>
    <type>swipe</type>
    <xstart>42</xstart>
    <ystart>200</ystart>
    <xend>500</xend>
    <yend>220</yend>
    <start_time>0.0</start_time>
    <end_time>0.2</end_time>
<gesture>
```

It will be appreciated that the foregoing is only provided by way of example, and that screen metadata can be formatted in many different ways, any of which can be used in various embodiments. The metadata can be interpreted by the application analysis computer 190 and used to generate simulated screen shots and/or screen animations showing the screen generated by the mobile application at the time of the reportable event, along with the user's interaction with the screen.

Figure 6:
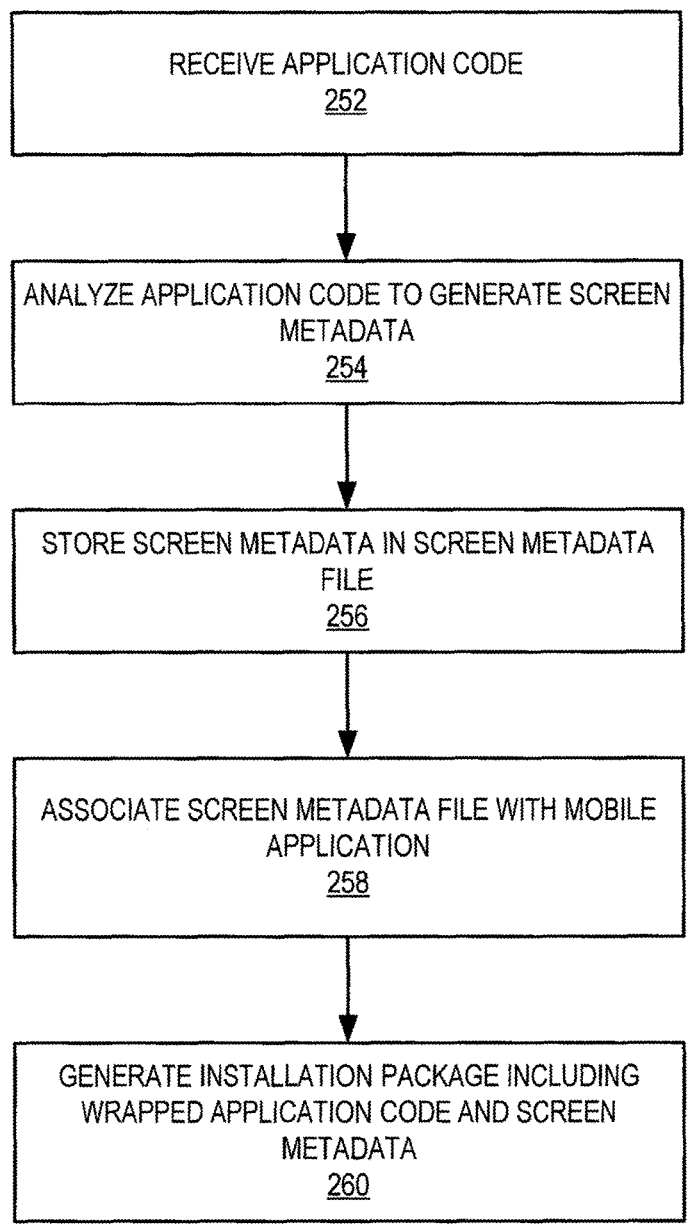
FIGS. 6, 7, 8 and 9 are flowcharts illustrating operations associated with the generation, transmission and use of screen metadata according to some embodiments.

Operations of a development platform 200 described herein according to various embodiments of the inventive concepts are illustrated in FIG. 6. As shown therein, the operations include receiving application code of a mobile application (block 252) and analyzing the application code to generate screen metadata that describes screens generated by the application code (block 254). The development platform 200 stores the screen metadata in a screen metadata file (block 256) and associates the screen metadata file with the mobile application (block 258). For example, the development platform 200 may associate the screen metadata file with a particular version, operating system and/or platform associated with the mobile application.

The development platform 200 may then generate an application installation package including the mobile application that is wrapped by the MAA application, and also including the screen metadata file (block 260).

Figure 7:
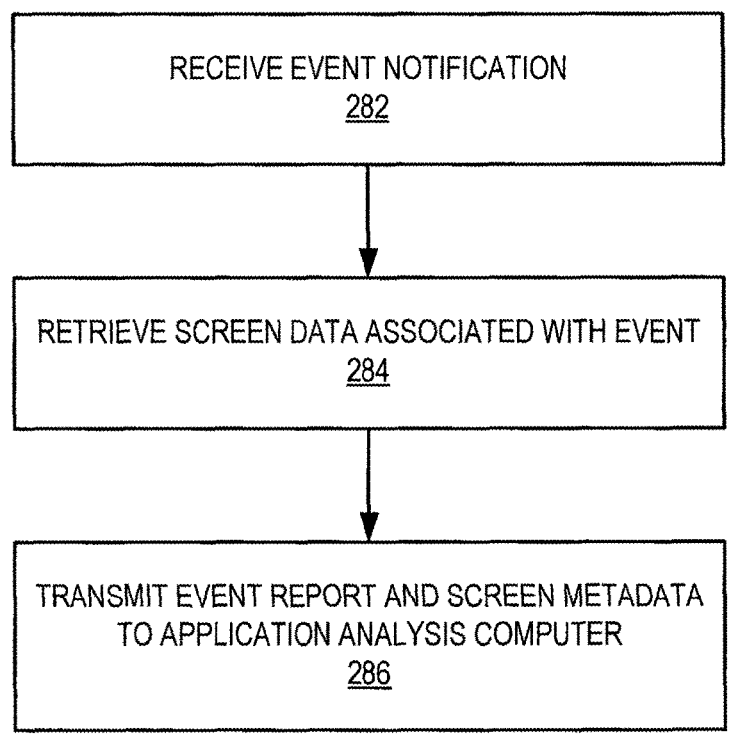

Operations of an MAA application wrapper according to further embodiments that is operating on a mobile device are illustrated in FIG. 7. As shown therein, the operations include receiving an event notification (block 282). The event notification may be received, for example, from an operating system of the mobile device and/or from the mobile application. The MAA application may then retrieve screen metadata associated with the state of the mobile application when the event notification was received (block 284)

Finally, the MAA application transmits an event report to the application analysis computer (block 286). Included in or with the event report is screen metadata describing the screen that was being displayed by the mobile application when the reportable event occurred.

Figure 8:
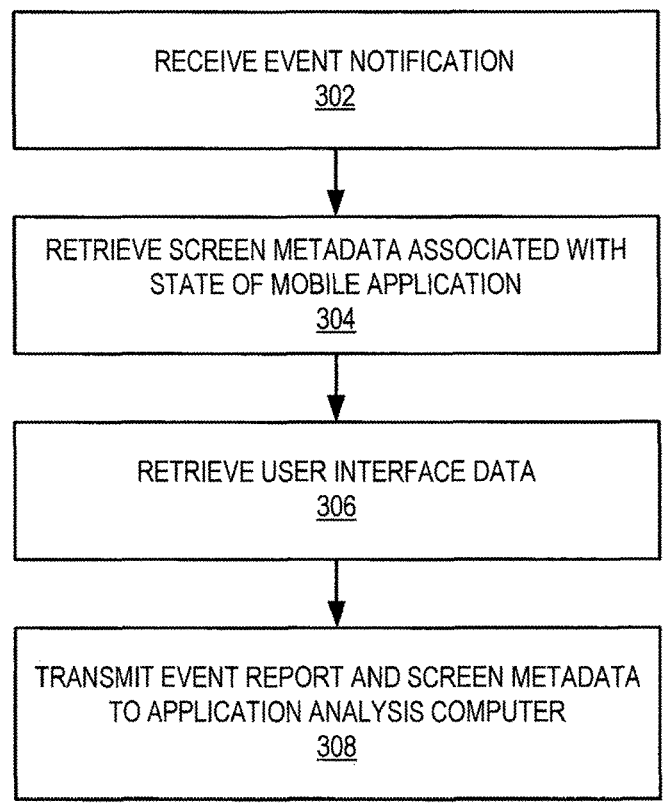

Operations of an MAA application wrapper according to further embodiments that is operating on a mobile device are illustrated in FIG. 8. As shown therein, the operations include receiving an event notification (block 302). The MAA application may then retrieve screen metadata associated with the state of the mobile application when the event notification was received (block 306), and may also generate screen animation data from user interface data (block 308). In some embodiments, the MAA application may intercept and record screen interaction data provided by the operating system to the mobile application, so that when an event notification occurs, the MAA application may already have available to it data describing the operator's interactions with the mobile application when the event notification is received.

Finally, the MAA application transmits an event report to the application analysis computer (block 308). Included in or with the event report is screen metadata describing the screen that was being displayed by the mobile application when the reportable event occurred and user interaction data describing user interaction with the screen when the reportable event occurred.

Figure 9:
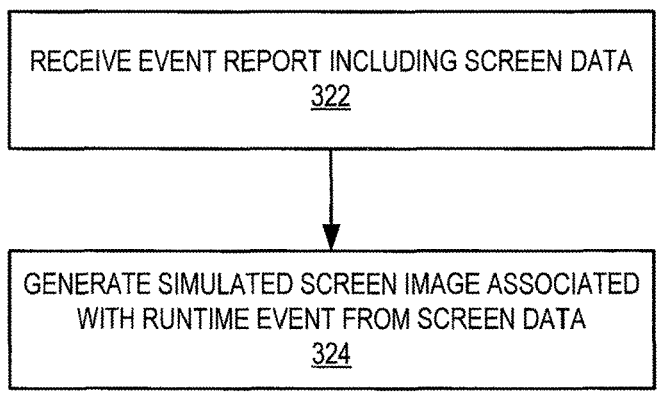

FIG. 9 illustrates operations of an application analysis computer upon receipt of an event report from an MAA application. After the event report is received (block 322), the application analysis computer retrieves screen metadata associated with the event from the event report and generates a simulated screen image, or images, possibly together with screen animations, associated with the reportable event (block 324).

Figure 10:
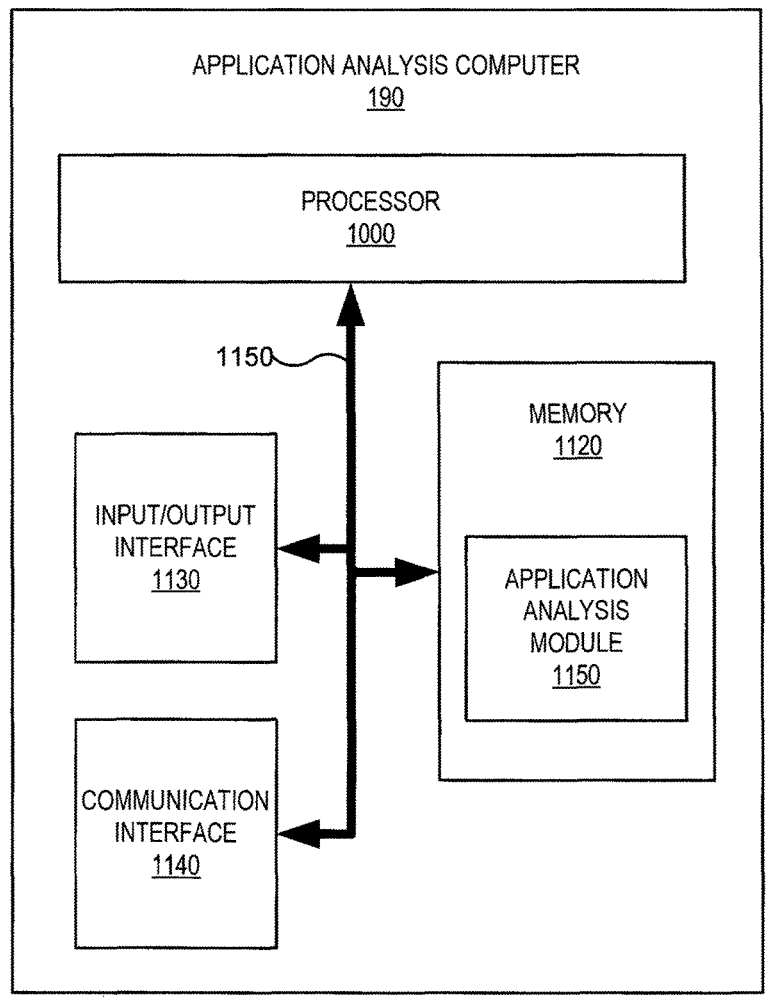
FIG. 10 is a block diagram illustrating an application analysis computer according to some embodiments.

FIG. 10 illustrates an application analysis computer 190. The application analysis computer may be implemented using a general purpose programmable digital computer, and may include a processor 1000, such as a microprocessor, microcontroller, etc., that controls operation of the computer 190. The processor 1000 communicates with a memory 1120, an input/output interface 1130 and a communication interface 1140 via a system bus 1150. An application analysis module 1150 is installed in the memory 1120 of the application analysis computer 190 and performs the functions described above with respect to analysis of screen metadata and the generation of simulated screen images.

Figure 11:
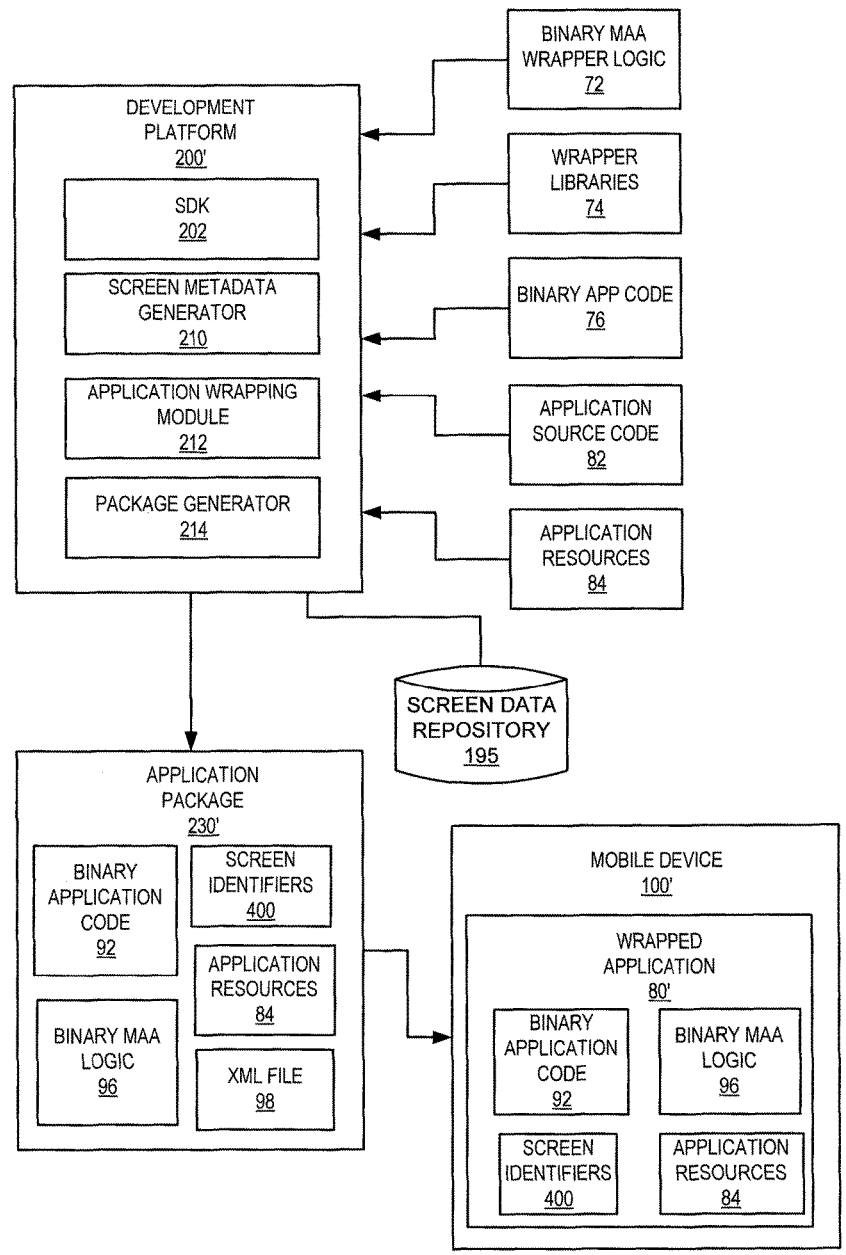
FIG. 11 is a block diagram illustrating the packaging and installation of an application on a mobile computing device according to further embodiments.
Figure 12:
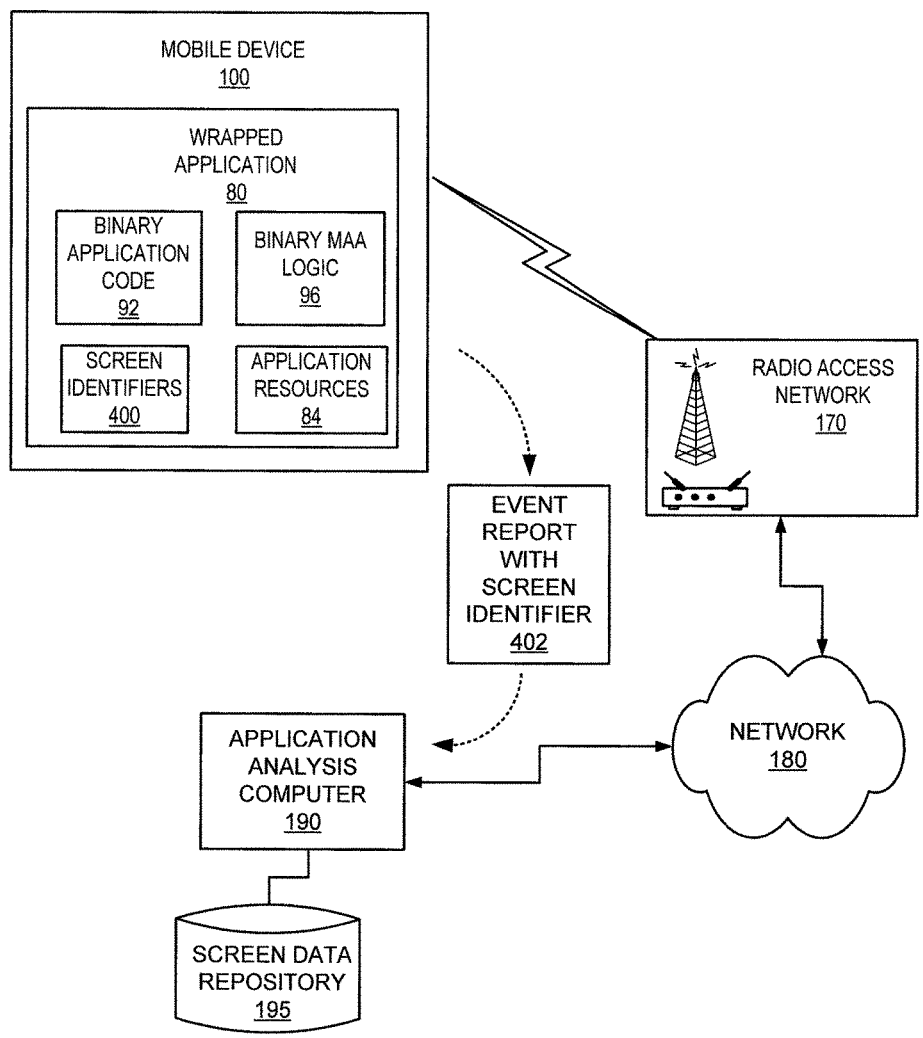
FIG. 12 is a block diagram illustrating the transmission of an event report from a mobile computing device to an application analysis computer according to further embodiments.

Further embodiments are illustrated in FIGS. 11-17. In particular, FIG. 11 illustrates the generation and installation of an application package on a mobile device 100' using a development platform 200' according to further embodiments. FIG. 12 illustrates the generation and transmission of an event report according to further embodiments. A description of features of FIGS. 11 and 12 having the same reference signs as corresponding features in FIGS. 2B and 3 will not be described for brevity.

As noted above, in some embodiments, one or more screen shots of screens displayed by the mobile application can be captured showing screen layouts during various points of operation of the mobile application. The screen shots can be saved in the screen data repository 195, and can be associated with screen IDs, e.g., SCR000, SCR001, SCR002, etc. The screen identifiers can also be saved in the screen data repository 195 and can be associated with the screen shots.

Referring to FIGS. 11 and 12, in some embodiments, screen identifiers can be saved in a screen identifier file 400 that is included in the application package 230' and installed in the wrapped application 80'. When a reportable event occurs, a screen identifier corresponding to the screen associated with the reportable event is retrieved by the binary MAA logic 96 and included in the event report 402. When the event report is received by the application analysis computer 190, the application analysis computer 190 retrieves the screen identifier from the event report 402, and then retrieves a screen shot, screen image, and/or screen metadata from which a screen image can be generated, from the screen data repository. The screen shot, screen image, and/or screen metadata is associated with the screen identifier received in the event report 402, and can be retrieved based on the screen identifier.

If screen metadata is stored in the screen data repository, a model of the screen image generated by the mobile application can be recreated from data in the screen metadata. In these embodiments, only a screen identifier is included in the event report. Instead of transmitting a (relatively large) screen shot or series of screen shots, or even screen metadata, to an application analysis computer in connection with the reportable event, the MAA application wrapper may transmit a screen identifier associated with the screen image, which may require the transmission of only a relatively small amount of data compared to the amount of image data that a screen shot, or even screen metadata, comprises.

Figure 13:
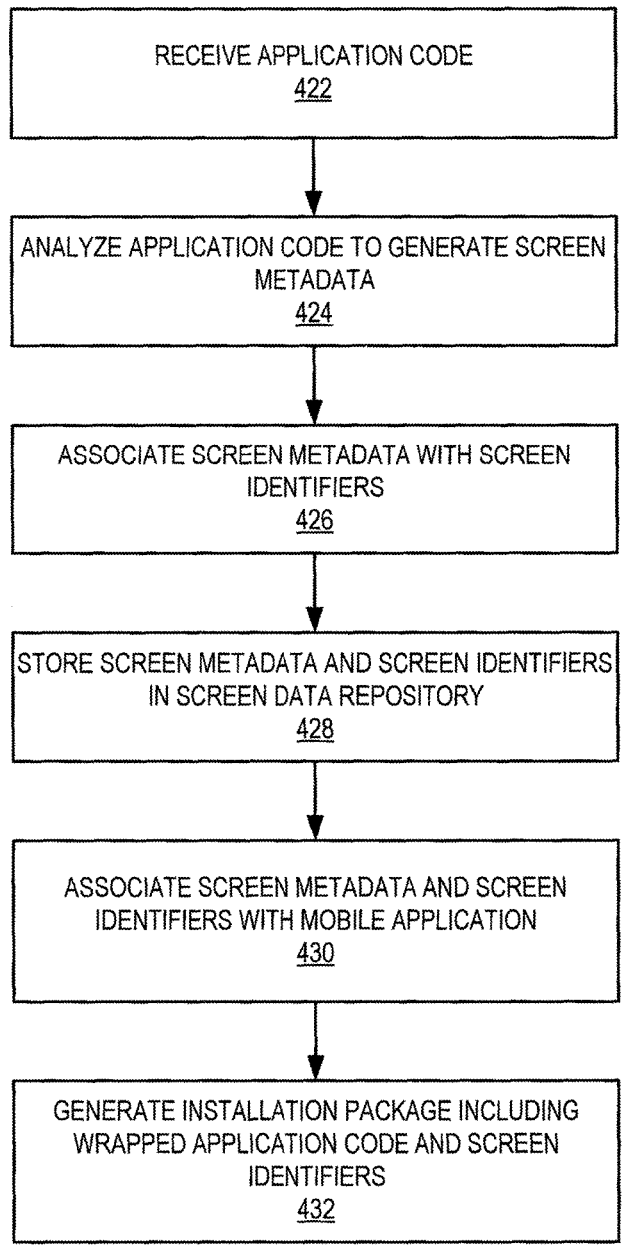
FIGS. 13, 14, 15, 16, and 17 are flowcharts illustrating operations associated with the generation, transmission and use of screen identifiers according to further embodiments.

Operations of the development platform 200' illustrated in FIG. 11 are illustrated in FIG. 13. As shown therein, the operations include receiving application code of a mobile application (block 422) and analyzing the application code to generate screen metadata that describes screens generated by the application code (block 424). The development platform 200' associates the screen metadata with screen identifiers that describe screen images (block 426), and stores the screen metadata and screen identifiers in a screen data repository (block 428). The development platform 200' also associates the screen metadata and screen identifiers with the mobile application (block 430).

The development platform 200 may then generate an application installation package including the mobile application that is wrapped by the MAA application, and also including the screen identifiers (block 432).

Figure 14:
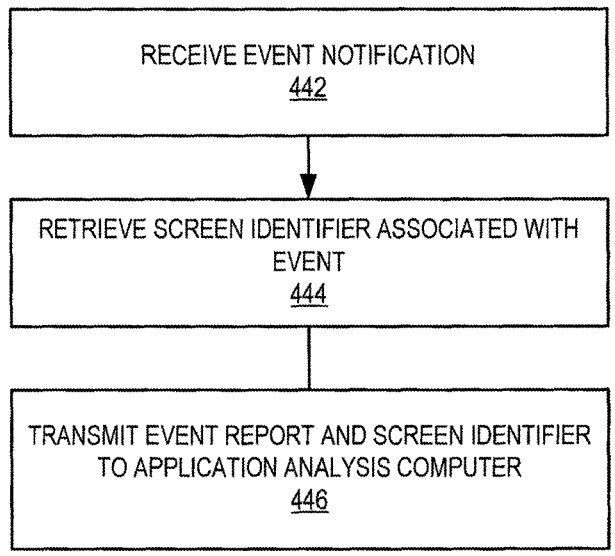

Operations of an MAA application wrapper according to further embodiments that is operating on a mobile device are illustrated in FIG. 14. As shown therein, the operations include receiving an event notification (block 442). The event notification may be received, for example, from an operating system of the mobile device and/or from the mobile application. The MAA application may then retrieve a screen identifier that describes or refers to a screen displayed by the mobile application when the event notification was received (block 444)

Finally, the MAA application transmits an event report including the screen identifier to the application analysis computer (block 446).

Figure 15:
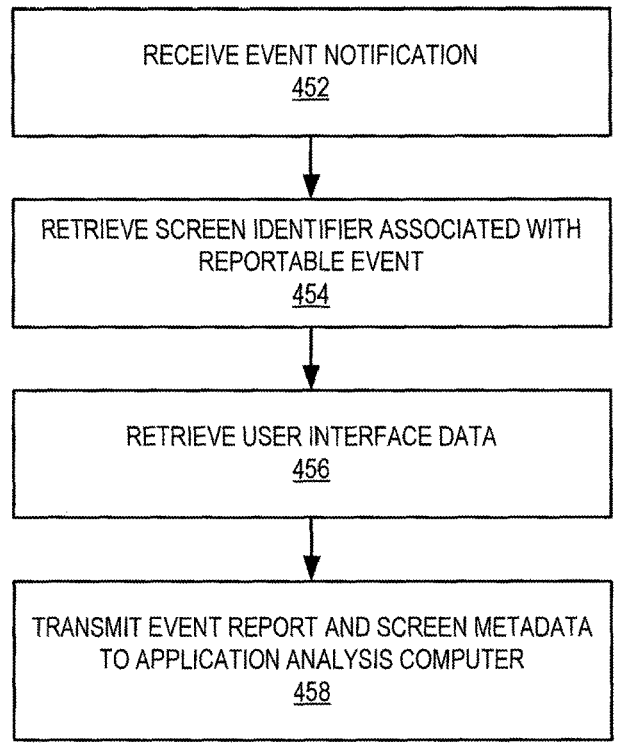

Operations of an MAA application wrapper according to further embodiments that is operating on a mobile device are illustrated in FIG. 15. As shown therein, the operations include receiving an event notification (block 452). The MAA application may then retrieve a screen identifier that identifies a screen displayed by the mobile application when the event notification was received (block 454). The MAA application wrapper generates screen animation data from user interface data (block 456), and then transmits an event report to the application analysis computer (block 458) including the screen identifier and the screen animation data. The screen animation may be generated by the MAA's user interface logic which has access to the screen identifiers from the event stream and the registry of screen metadata that matches the screen identifiers to the reference screen images/captures.

Figure 16:
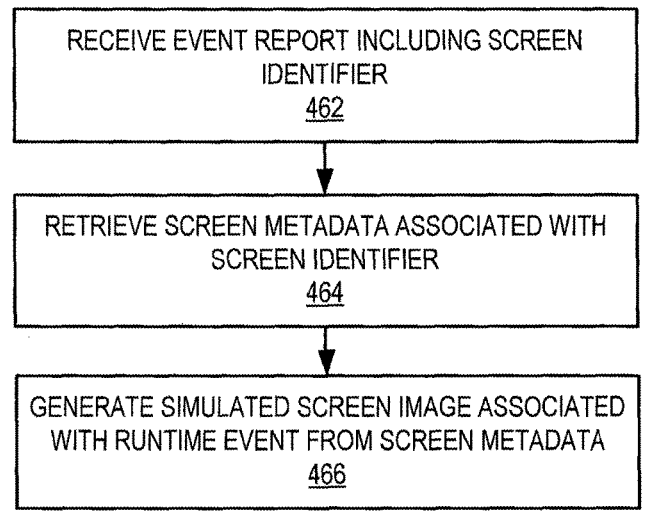

FIG. 16 illustrates operations of an application analysis computer upon receipt of an event report from an MAA application. When an event report is received (block 462), the application analysis computer 190 obtains a screen identifier associated with the event from the event report. The application analysis computer then retrieves screen metadata associated with the screen identifier from screen image data stored in the screen data repository 195 (block 464), and generates a simulated screen image, or images, possibly together with screen animations, associated with the reportable event from screen metadata stored in the screen data repository 195 (block 466).

Figure 17:
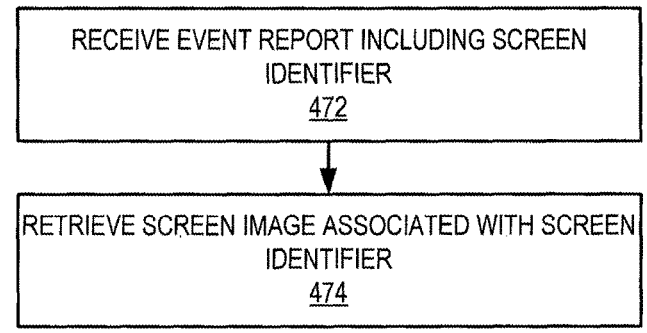

FIG. 17 illustrates operations of an application analysis computer upon receipt of an event report from an MAA application according to further embodiments. When an event report is received (block 472), the application analysis computer 190 obtains a screen identifier associated with the event from the event report. The application analysis computer then retrieves a screen image associated with the screen identifier from screen image data stored in the screen data repository 195 (block 474). The screen image can be used, for example, to help a developer better understand the reportable event.

In the above-description of various embodiments of the present disclosure, aspects of the present disclosure may be illustrated and described herein in any of a number of patent-eligible classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method performed by a mobile computing device in communication with an application analysis computer operating in a communication network, the method comprising:
   analyzing operation of a mobile application during runtime execution of the mobile application on the mobile computing device;
   receiving a screen metadata file comprising screen IDs of screen images of the executed mobile application stored in a screen image repository of the communication network, each screen ID associated with an operational mode of the mobile application during runtime execution;
   identifying a reportable runtime event during operation of the mobile application on the mobile computing device; and
   in response to identifying the reportable runtime event:
      generating screen metadata that describes a screen image generated by the mobile application and associated with the reportable runtime event;
      generating a runtime event report, wherein the runtime event report includes the screen metadata and excludes the screen image described by the screen metadata; and
      transmitting the runtime event report, excluding the screen image, to the application analysis computer to cause the application analysis computer to determine the cause of the reportable runtime event at the mobile computing device,
   wherein the generated screen metadata comprises a screen ID of the screen IDs that is associated with a screen image of the screen images stored in the screen image repository.

2. The method of claim 1, wherein the screen metadata describes a plurality of sequential screen images generated by the mobile application and associated with the reportable runtime event.

3. The method of claim 1, wherein the screen metadata further comprises user interaction data describing user interaction with the screen image during the reportable runtime event.

4. The method of claim 3, further comprising:
   generating an animation of user interaction with the mobile application using the screen metadata and the user interaction data;
   wherein transmitting the runtime event report to the application analysis computer comprises transmitting the runtime event report to the application analysis computer together with the animation.

5. The method of claim 1, wherein the screen metadata is generated at runtime by the mobile application.

6. The method of claim 1, wherein analyzing operation of the mobile application at runtime comprises intercepting system calls issued by the mobile application and event notifications issued to the mobile application at runtime.

7. A method performed by a computing device of a communication network, the computing device in communication with a mobile computing device operating in a communication network, the method comprising:
   receiving binary executable code of a mobile application for execution on the mobile computing device;
   executing the binary executable code to generate screen images that will be displayed on the mobile computing device upon execution of the binary executable code at the mobile computing device;
   storing the screen images in a screen image repository of the communication network;
   associating the screen images with the mobile application;
   generating screen metadata that describes the stored screen images associated with the mobile application, wherein generating the screen metadata comprises generating screen IDs to associate with each of the stored screen images;
   generating a screen metadata file comprising the screen metadata associated with the mobile application, the screen metadata file excluding the screen images;
   providing the screen metadata file, excluding the screen images, to the mobile computing device in an application package for extraction at the mobile computing device, and
   wherein generating the screen metadata file comprising the screen IDs comprises:
      associating operational modes of the application program with each of the screen IDs; and
      generating the screen metadata file to comprise the operational modes associated with each of the screen IDs.

8. The method of claim 1, wherein the screen metadata describes a series of screens displayed on a display of the mobile computing device before, during, and after the reportable runtime event.

9. The method of claim 1, wherein generating the screen metadata comprises selecting the screen ID of the screen IDs from the screen metadata file based on an operational mode of the mobile application when the reportable runtime event occurs.

10. The method of claim 9, wherein generating the runtime event report comprises generating the runtime event report to include the selected screen ID.

11. The method of claim 1, wherein receiving the screen metadata file comprises receiving the screen metadata file in an application installation package.

12. The method of claim 11, wherein the application installation package comprises a binary code of the mobile application, a binary wrapper logic of the mobile application, resources of the mobile application, and a manifest of the mobile application.

13. The method of claim 7, wherein generating the screen metadata file comprises generating the screen metadata file comprising the screen IDs associated with each of the stored screen images.

14. The method of claim 7, wherein the screen metadata includes data that can be used by an application analysis computer of the communication network to recreate the basic appearance of the screen images without requiring access to the screen images.

15. The method of claim 1, wherein the communication network comprises a radio access network; and
   wherein transmitting the runtime event report to the application analysis computer comprises transmitting the runtime event report over the radio access network to the application analysis computer.

16. The method of claim 7, wherein the computing device comprises a compiler.

* * * * *